(12) United States Patent
Gutierrez

(10) Patent No.: US 12,455,831 B2
(45) Date of Patent: Oct. 28, 2025

(54) ADDRESS TRANSLATION SERVICE MANAGEMENT

(71) Applicant: Advanced Micro Devices, Inc., Santa Clara, CA (US)

(72) Inventor: Anthony Thomas Gutierrez, Seattle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/949,716

(22) Filed: Sep. 21, 2022

(65) Prior Publication Data

US 2024/0095184 A1    Mar. 21, 2024

(51) Int. Cl.
*G06F 12/1027* (2016.01)
*G06F 12/0882* (2016.01)

(52) U.S. Cl.
CPC ...... *G06F 12/1027* (2013.01); *G06F 12/0882* (2013.01)

(58) Field of Classification Search
None
See application file for complete search history.

(56) References Cited

U.S. PATENT DOCUMENTS

| | | | | |
|---|---|---|---|---|
| 10,459,852 | B1* | 10/2019 | Michaud | G06F 13/161 |
| 10,657,067 | B1* | 5/2020 | Azad | G06F 12/1036 |
| 2007/0038799 | A1* | 2/2007 | Hummel | G06F 12/145 711/3 |
| 2008/0235487 | A1* | 9/2008 | Illikkal | G06F 12/126 711/207 |
| 2010/0005269 | A1* | 1/2010 | Davies | G06F 12/126 711/E12.002 |
| 2010/0313201 | A1* | 12/2010 | Warton | G06F 9/45558 718/1 |
| 2014/0281260 | A1* | 9/2014 | Peterson | G06F 3/0679 711/135 |
| 2016/0062916 | A1* | 3/2016 | Das | G06F 12/1027 711/133 |
| 2016/0378674 | A1 | 12/2016 | Cheng et al. | |
| 2017/0206171 | A1 | 7/2017 | Mukherjee et al. | |
| 2017/0372088 | A1 | 12/2017 | Zhao et al. | |
| 2018/0011792 | A1* | 1/2018 | Koker | G06F 12/1009 |
| 2018/0026907 | A1* | 1/2018 | Miller | H04L 49/00 |
| 2018/0300258 | A1* | 10/2018 | Wokhlu | G06F 12/0862 |

(Continued)

FOREIGN PATENT DOCUMENTS

| | | |
|---|---|---|
| CN | 119907972 A | 4/2025 |
| EP | 4591173 | 7/2025 |

(Continued)

OTHER PUBLICATIONS

PCT/US2023/074720 , "International Seach Report and Written Opinion", PCT Application No. PCT/US2023/074720, Jan. 22, 2024, 8 pages.

*Primary Examiner* — Jared I Rutz
*Assistant Examiner* — Alexander J Yoon
(74) *Attorney, Agent, or Firm* — FIG. 1 Patents

(57) ABSTRACT

Address translation service management techniques are described. These techniques are based on metadata that is usable to provide a hint as insight into memory access, and based on this, use of a translation lookaside buffer is optimized to control which entries are maintained in the queue and manage address translation requests.

20 Claims, 5 Drawing Sheets

(56) References Cited

U.S. PATENT DOCUMENTS

| | | | |
|---|---|---|---|
| 2019/0188154 A1* | 6/2019 | Basu Roy Chowdhury ................ G06F 12/1027 | |
| 2019/0303221 A1* | 10/2019 | Masputra ............ | G06F 16/2228 |
| 2020/0042249 A1* | 2/2020 | Kang ................... | G06F 12/0897 |
| 2020/0210347 A1* | 7/2020 | Tian .................... | G06F 12/0888 |
| 2021/0019069 A1 | 1/2021 | Sendai et al. | |
| 2021/0191877 A1* | 6/2021 | Leming, III ........ | G06F 12/1027 |

FOREIGN PATENT DOCUMENTS

| | | |
|---|---|---|
| KR | 1020220041937 | 3/2021 |
| WO | 202064776 A1 | 3/2024 |

* cited by examiner

600

602
Generate, by a host, a command packet including a virtual address, an instruction, and metadata describing a memory access characteristic

604
Transmit, by the host, the command packet for receipt by a memory management agent, the metadata configured to control management of entries in a translation lookaside buffer by the memory management agent, the entries supporting translation of virtual and physical addresses

702
Receive, by a memory management agent, a command packet including an instruction, a virtual address, and metadata describing a memory access characteristic

704
Control, by the memory management unit, which entries are maintained in a translation lookaside buffer based on the metadata, the entries supporting translation between the virtual address and a physical address of physical memory

FIG. 7

ADDRESS TRANSLATION SERVICE MANAGEMENT

GOVERNMENT LICENSE RIGHTS

This invention was made with Government support under Contract No. H98230-22-C-0152 awarded by the Department of Defense. The Government has certain rights in this invention.

BACKGROUND

Virtual memory is a technique to manage use of shared physical memory, and through this, supports a variety of functionality. Examples of this functionality include expansion of an amount of storage made available to applications beyond that which is actually available in the physical memory, support heterogeneous system architectures, offload memory management from applications and operating systems, use of a variety of different types of memory without applications being made aware, support memory optimization, address memory fragmentation, and so forth.

To do so, memory management units are used to manage translation between virtual addresses and physical addresses. Conventional techniques, however, encounter challenges due to ever increasing functionality of systems and devices that employ virtual memory. An example of which includes latency caused by systems having a multitude of virtual machines, which hinders operation of devices that implement these systems.

BRIEF DESCRIPTION OF THE DRAWINGS

The detailed description is described with reference to the accompanying figures.

FIG. 6 depicts a procedure in an example implementation of command packet generation by a host to include metadata.

FIG. 7 depicts a procedure in an example implementation of receipt of command packet including metadata and use of the metadata to control inclusion of entries in a translation lookaside buffer.

DETAILED DESCRIPTION

Figure 1:
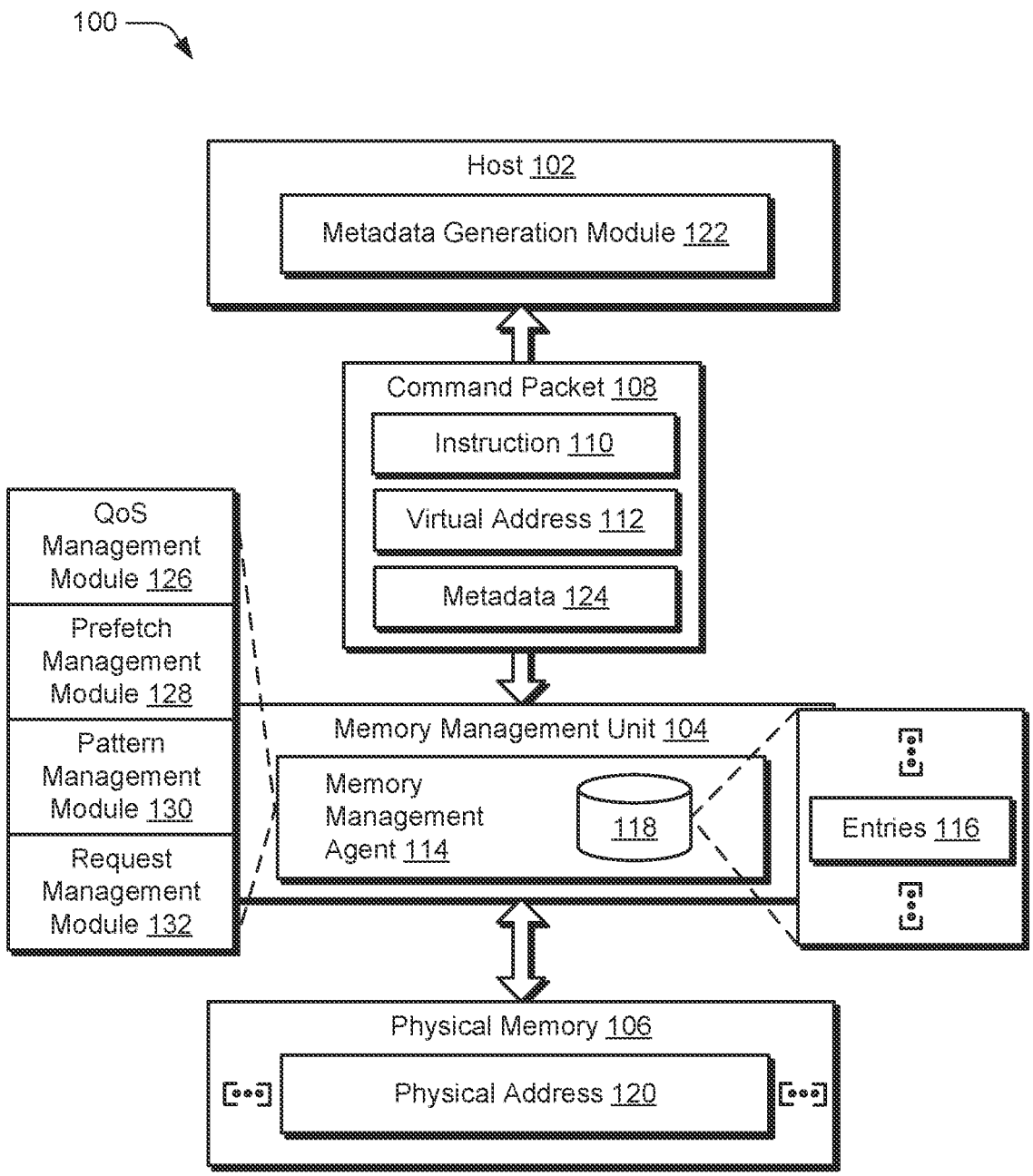
FIG. 1 is a block diagram of a non-limiting example system configured to employ address translation service management techniques.

Virtual memory is a technique used to expand functionality made available by devices to manage data storage. To support this, a memory management unit is tasked with translation between virtual addresses and physical addresses. In one example, this is usable to implement a heterogeneous system architecture in which a central processing unit and parallel processing unit employ the virtual addresses as part of a unified virtual memory space to share physical memory. Other examples are also contemplated, e.g., to expand an amount of storage made available to applications, offload memory management, support use of a variety of different types of memory, support memory optimization, address memory fragmentation, and so forth.

To support address translation, the memory management unit includes a translation lookaside buffer having entries that define a translation between virtual addresses and physical addresses, i.e., a mapping between the addresses. The translation lookaside buffer is configurable in a variety of ways, examples of which include an address translation cache (ATC), content addressable memory (CAM) table, priority queue, and so forth. Conventional techniques, however, are challenged by expanding functionality of devices that rely on address translation. An example of this involves use of unified virtual memory and demand paging of heterogenous system architectures that encounter latency in translation and hinder translation lookaside buffer (TLB) operation in real-world scenarios.

To solve these problems, address translation service (ATS) management techniques are described. These techniques are based on metadata that is usable to provide a hint as insight into memory access, and based on this, optimize use of ATS requests to control which address translations are maintained in a translation lookaside buffer (TLB) and which memory pages are stored in physical memory.

In one example, a host (e.g., operating system or application executed on a central processing unit) generates a command packet. The command packet in this example includes an instruction (e.g., a command, a memory instruction to load or write data, a sequence of instructions, etc.), a virtual address, and metadata. The metadata describes a memory access characteristic that is then usable to control use by a memory management agent. Once generated, the command packet is transmitted by the host to a an accelerator's command queue.

The command packet is received by the accelerator's command queue. A command processor, for instance, of the accelerator processes the command packet using firmware to interpret fields that include the metadata. The metadata is then utilized by a memory management agent (e.g., as part of an address translation agent of the memory management unit) to control functionality involving the ATS. This functionality includes managing entries in the translation lookaside buffer, ATS requests, translation pre-fetches, and memory page migration.

In one example, the management is based on access patterns associated with the memory access. The metadata, for instance, is configurable to indicate an irregular memory access pattern with a high reuse distance. Consequently, entries associated with the irregular memory access pattern are restricted from being stored in the TLB. This is due to a relatively low likelihood that entries will be reused and a corresponding increased likelihood of displacing an entry in the queue that has a higher likelihood of reuse. Similarly, metadata indicating a dense memory access pattern causes the memory management agent to store corresponding entries in the TLB. Further, this metadata also supports prefetch of entries as further described below to the TLB, such as by leveraging insight into a reuse distance in the dense access pattern to obtain additional entries.

In another example, the metadata is used to implement quality-of-service considerations by the memory management agent. This is usable, for instance, to support priority information, deadlines for respective tasks to meet a corresponding service level agreement (SLA), and so forth. In a further example, use of the metadata by the memory management agent leverages prefetching techniques for memory translations thereby reducing translation latency and supporting precise and timely access to entries in the TLB, thereby reducing translation overhead. In a further example, use of the metadata by the memory management agent leverages prefetching techniques for memory pages thereby reducing page fault latency and supporting precise and timely access to memory pages, thereby reducing page fault overhead.

In a further example, ATS requests are managed to improve operational efficiency. In a scenario, for instance, in which a device sends a request to an I/O memory management unit (IOMMU) to retrieve a request, those requests are batched to avoid the overhead of sending individual requests, e.g., by sending a single request that asks for multiple translations. Additionally, requests from multiple commands that request access the same pages are batched in another scenario. This is performed for instance, in response to detecting when a request matches an already in flight request and combining those requests. The response for the initial request can service the second request as well. In another scenario, an initial request is deferred for a time to detect whether subsequent requests request access to the same memory, and if so, are combined before being sent.

In an implementation, a command processor is also employed for operation with the memory management agent. The command processor is programmable to implement policies to assist the memory management agent in managing the TLB, ATS requests, and page migrations. The policies are configurable to support domain-specific optimizations and device reuse (e.g., accelerator reuse) across applications.

In one such example, the memory management agent is implemented as part of a domain-specific accelerator, e.g., for machine learning. Domain-specific accelerators are configurable for targeted functionality, thereby supporting intelligent address translation management. However, in real-world scenarios variations are encountered in virtual memory usage based on input data, individual kernel characteristics, and so forth. Therefore, configuration of the command processor to support programming in conjunction with operation of the memory management agent allows domain-specific firmware to tailor address translation functionality to specific use cases through policies that are executed by the command processor. This also supports an ability of a device that implements these features to evolve along with the evolution of application functionality, thereby improving device operation. A variety of other instances are also contemplated, examples of which are described as follows and shown using corresponding figures.

In some aspects, the techniques described herein relate to a method including receiving, by a memory management agent, a command packet including a virtual address, and metadata describing a memory access characteristic, and controlling, by the memory management agent, which entries are maintained in a translation lookaside buffer (TLB) based on the metadata, the entries supporting translation between the virtual address and a physical address of physical memory.

In some aspects, the techniques described herein relate to a method, wherein the metadata describes usage of data associated with the virtual address.

In some aspects, the techniques described herein relate to a method, wherein the metadata indicates an irregular memory access pattern and the controlling includes restricting storage of entries associated with the irregular memory access pattern in the translation lookaside buffer.

In some aspects, the techniques described herein relate to a method, wherein the metadata indicates a dense memory access pattern and the controlling includes storing entries associated with dense memory access pattern in the translation lookaside buffer.

In some aspects, the techniques described herein relate to a method, wherein the metadata indicates a domain type and the controlling is based on the domain type.

In some aspects, the techniques described herein relate to a method, wherein the controlling includes invalidating at least one said entry in the translation lookaside buffer, replacing at least one said entry in the translation lookaside buffer, or controlling when to store at least one said entry in the translation lookaside buffer.

In some aspects, the techniques described herein relate to a method, wherein the controlling includes prefetching at least one said entry to the translation lookaside buffer based on the metadata.

In some aspects, the techniques described herein relate to a method, wherein the controlling includes controlling which entries are maintained in the translation lookaside buffer based on quality-of-service.

In some aspects, the techniques described herein relate to a method, wherein the controlling includes controlling page migrations, page placement, page pre-fetching, or page removal.

In some aspects, the techniques described herein relate to a method, wherein the virtual address is part of a unified virtual memory space in which a central processing unit and a parallel compute unit share physical memory as part of a heterogeneous system architecture.

In some aspects, the techniques described herein relate to a device including: a translation lookaside buffer configured to store entries for translation between virtual addresses and physical addresses, and an address translation agent configured to manage which entries are maintained in the translation lookaside buffer based on metadata received via a command packet, the metadata describing a memory access characteristic.

In some aspects, the techniques described herein relate to a device, further including physical memory accessible via the physical addresses and wherein the virtual addresses implement a unified virtual memory space in which a central processing unit and a parallel compute unit share the physical memory as part of a heterogeneous system architecture.

In some aspects, the techniques described herein relate to a device, further including a command processor that is configured to receive the command packet having the metadata, an instruction, and a virtual address and transmits the metadata to the address translation agent.

In some aspects, the techniques described herein relate to a device, wherein the command processor is configured as a programmable microcontroller to implement at least one policy controlling transmission of the metadata to the address translation agent.

In some aspects, the techniques described herein relate to a device, wherein the address translation agent is configured to manage address translation requests.

In some aspects, the techniques described herein relate to a device, wherein the address translation agent is configured to manage at least one said address translation request by deferring transmission of the at least one said address translation request.

In some aspects, the techniques described herein relate to a device, wherein the address translation agent is configured to batch a plurality of address translation requests as a single request.

In some aspects, the techniques described herein relate to a device, wherein the plurality of address translation requests correspond, respectively, to a plurality of commands.

In some aspects, the techniques described herein relate to a method including: generating, by a host, a command packet including a virtual address and metadata describing a memory access characteristic and transmitting, by the host, the command packet for receipt by a memory management agent, the metadata configured to control management of entries in an translation lookaside buffer by the memory management agent, the entries supporting translation of virtual and physical addresses.

In some aspects, the techniques described herein relate to a method, wherein the command packet includes an instruction configured to load data from physical memory.

FIG. 1 is a block diagram of a non-limiting example system 100 configured to employ translation lookaside buffer (TLB) management techniques that are based on metadata. The system 100 includes a host 102, a memory management unit 104, and a physical memory 106, e.g., volatile or non-volatile memory. The host 102 in this example is representative of functionality to originate a command packet 108. The command packet 108 is configurable for use in a variety of scenarios, an example of which includes use in a point-to-point bus having serial links connecting corresponding devices to a root complex as further described in relation to FIG. 3.

The command packet 108 includes an instruction 110, such as a memory instruction to load data from or write data to physical memory 106 based on a corresponding virtual address 112. To do so, a memory management agent 114 includes entries 116, illustrated as maintained in a translation lookaside buffer (TLB) 118. The entries 116 define a translation between the virtual address 112 and a corresponding physical address 120 in the physical memory 106. In other words, the entries 116 define a mapping between the virtual address 112 and corresponding physical address 120. This is usable to support a variety of functionality, an example of which includes a heterogenous system architecture as further described in relation to FIG. 2.

In the illustrated example, the host 102 includes a metadata generation module 122. The metadata generation module 122 is configured to generate metadata 124 for inclusion as part of the command packet 108, e.g., a payload of the packet. The metadata 124 describes a memory access characteristic usable to describe a characteristic of data that is a subject of the command packet, provide insight into potential subsequent memory access, and so forth. In this way, the metadata 124 acts as a "hint" provided by the host 102 regarding memory accesses. The memory management agent 114 is configured to leverage insight provided by the metadata 124 to manage which entries 116 are maintained in the TLB 118.

Examples of functionality usable to manage access based on the metadata 124 are illustrated as a quality-of-service (QoS) management module 126, a prefetch management module 128, a pattern management module 130, and a request management module 132. The QoS management module 126 is configured to implement quality-of-service considerations, e.g., to support priority information, deadlines for task to meet a corresponding service level agreement (SLA), and so forth. The prefetch management module 128 supports prefetch of entries 116 to the TLB 118. The pattern management module 130 is configurable to manage entries based on patterns of memory access observed and/or are likely to be encountered as part of subsequent memory access.

The request management module 132 is representative of functionality to manage address translation service requests that are used to initiate respective translation operations. In an instance in which a device sends a request to an I/O memory management unit (IOMMU) to retrieve a request, a plurality of those requests are batched by the request management module 132 to reduce an overhead otherwise encountered in sending individual requests, e.g., by batching a plurality of address translation requests as a single request. This is also usable to batch a plurality of address translation requests that corresponding, respectively, to a plurality of commands, e.g., that pertain to the same pages. This is performable in one example by detecting when an address translation request matches an already "in flight" address translation request and combining those requests. In another example of request management, transmission of an address translation request is deferred, to determine if subsequent requests involve access to the same memory, which are then batched as described above.

As a result, the metadata 124 provides a degree of control of the host 102 to provide insight and improve address translation operation. Further, the memory management agent 114, through use of the metadata 124, is configured to reduce translation latency as further described in the following example.

Figure 2:
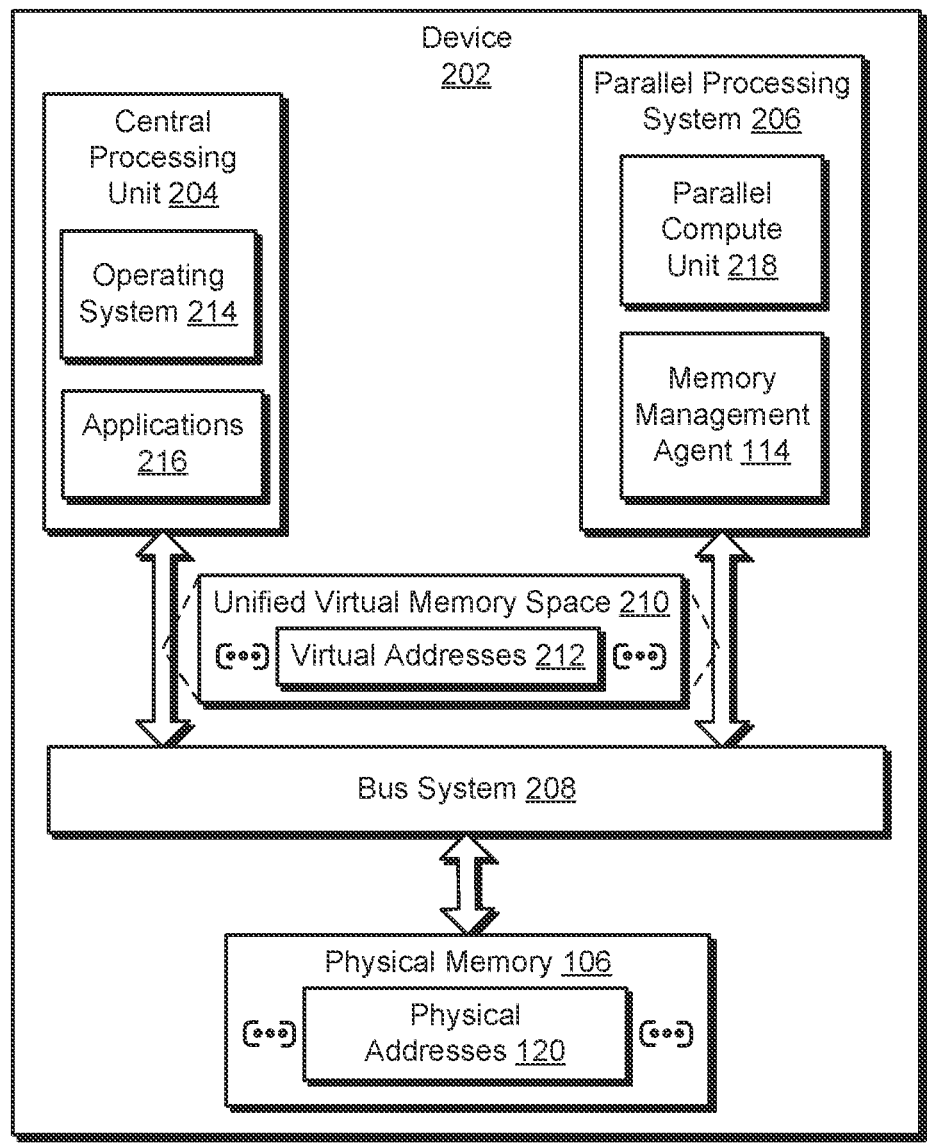
FIG. 2 is a block diagram of a non-limiting example system configured to implement a memory management agent and a translation lookaside buffer of FIG. 1 as part of a heterogeneous system architecture.

FIG. 2 is a block diagram of a non-limiting example system 200 configured to implement a memory management agent and TLB of FIG. 1 as part of a heterogeneous system architecture. The system 200 includes a device 202 that is configurable in a variety of ways. Device 202 configurations include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 202 and devices that implement the host 102, memory management unit 104, and physical memory 106 of FIG. 1 are configurable as any one or more of those devices listed just above and/or a variety of other devices without departing from the spirit or scope of the described techniques.

The device 202 is configured to implement a heterogeneous system architecture. In the illustrated example, this architecture includes a central processing unit 204, a parallel processing system 206, and physical memory 106 that are communicatively coupled, one to another, via a same bus system 208. The bus system 208 supports shared use of the physical memory 106 and tasks through implementation of a unified virtual memory space 210 of virtual addresses 212. The bus system 208, for instance, is configurable as a point-to-point bus having serial links connecting corresponding devices to a root complex, an example of which includes peripheral component interconnect express (PCIe).

The central processing unit 204 is configured to support execution of an operating system 214 and applications 216 that act as the host 102 to originate the command packet 108. The parallel processing system 206 is configurable in a variety of ways, examples of which include a graphics processing unit (CPUs), accelerator, digital signal processor (DSP), application specific integrated circuit (ASIC), and so forth. The parallel processing system 206, for instance, includes a parallel compute unit 218 implementing logic operations of the parallel processing system 206.

The unified virtual memory space 210 is implemented in this example such that the central processing unit 204 and the parallel processing system 206 share page tables. This enables data exchange by sharing pointers in what is referred to as a "zero-copy" operation, instead of copying data between the devices as involved in other architectures and as such improves device operation. However, as previously described conventional support of unified virtual memory and demand paging in some real-world scenarios leads to slow translations and hinders translation lookaside buffer operation.

To solve this problem, the device 202 incorporates the memory management agent 114 as part of the parallel processing system 206. The memory management agent 114 supports a flexible mechanism that is configurable to address considerations on a domain-specific basis and addresses long-latent address translation in systems having a multitude of virtual machine that target parallel processing systems 206 (e.g., accelerators) in a heterogeneous system.

Figure 3:
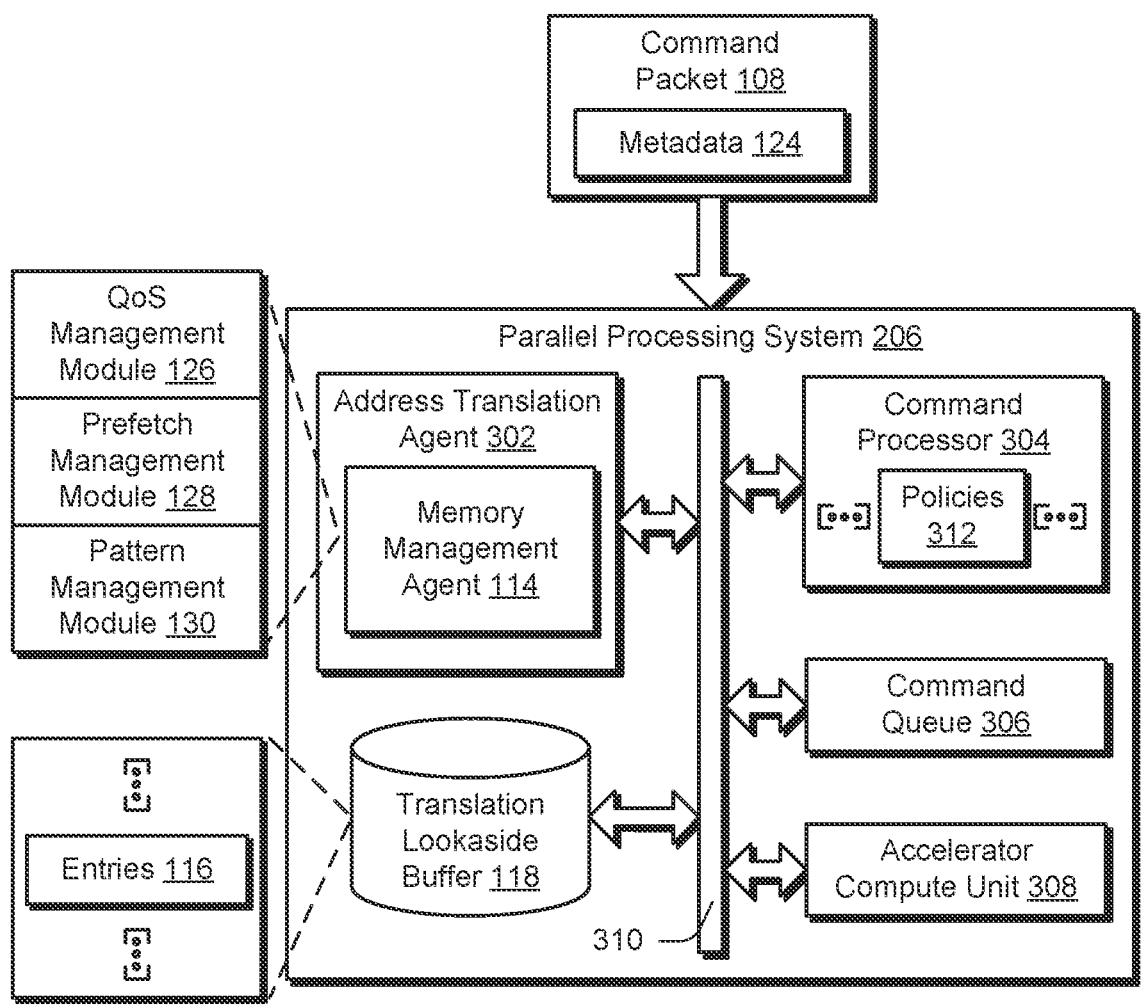
FIG. 3 is a block diagram of a non-limiting example system showing configuration of a parallel processing system of FIG. 2 as an accelerator.

FIG. 3 is a block diagram of a non-limiting example system 300 showing configuration of the parallel processing system 206 of FIG. 2 as an accelerator. The parallel processing system 206 includes an address translation agent 302 implementing the memory management agent 114, an address translation queue 118, a command processor 304, a command queue 306, and an accelerator computing unit 308 that are communicatively coupled 310 (e.g., via a bus), one to another.

In this example, metadata 124 regarding usage of the TLB 118 is embedded in the command packet 108. In an implementation, the command packet 108 is a heterogenous system architecture (HSA) packet, although packets for use with arbitrary compute agents is also contemplated.

The command processor 304 processes the command packet 108 using corresponding firmware to interpret fields in the packet as metadata 124. The command processor 304 then sends information to the address translation agent 302 to aid in making informed decisions regarding provision of address translation services for the device 202.

The address translation agent 302 is configured to manage the TLB 118. This includes controlling when to invalidate entries 116, how to replace entries 116, and/or when to cache entries 116. Because accelerators often execute kernels for a given domain and therefore programmers or intelligent runtimes have insight about contemplated virtual memory usage, the metadata 124 is configured to provide hints that are passed to the address translation agent 302 to communicate this insight into how to manage the TLB 118.

For example, a linear algebra accelerator is usable across a wide variety of domains (e.g., graph analytics, machine learning, scientific applications, etc.) that rely on matrix and vector multiplication. However, these domains vary in degrees of regularity of the memory accesses. Sparse linear algebra (SpLA) kernels such as sparse-matrix vector multiplication (e.g., used in graph and machine-learning applications) have highly irregular memory access patterns due to sparsity inherent in the matrixes. Dense linear algebra kernels, however, are highly regular.

Thus, when dispatching an SpLA kernel, the command packet 108 embeds information as part of the metadata 124 that indicates to the address translation agent 302 that the workload has irregular memory accesses with high reuse distance. The address translation agent 302 then dynamically determines in this example that the SpLA's translations are restricted from being cached because these entries are likely to displace other entries having increased usefulness and corresponding translations. On the other hand, entries 116 corresponding to a dense kernel's translations are cached because the entries 116 have a likelihood of being reused.

Additionally, the address translation agent 302 is configurable for optimization based on input data in addition to kernel type. For example, in a dense linear algebra kernel, reuse distance is determinable for pages in virtual memory based on the size and structure of the matrix. For a relatively large matrix with a significant number of rows, for instance, an approximate row reuse distance can be determined. Therefore, the entries 116 of translations corresponding to rows that are no longer in use are discarded from the TLB 118 to make room for entries 116 of translations from upcoming rows. In an implementation, this technique is performed in tandem with translation prefetching.

Figure 4:
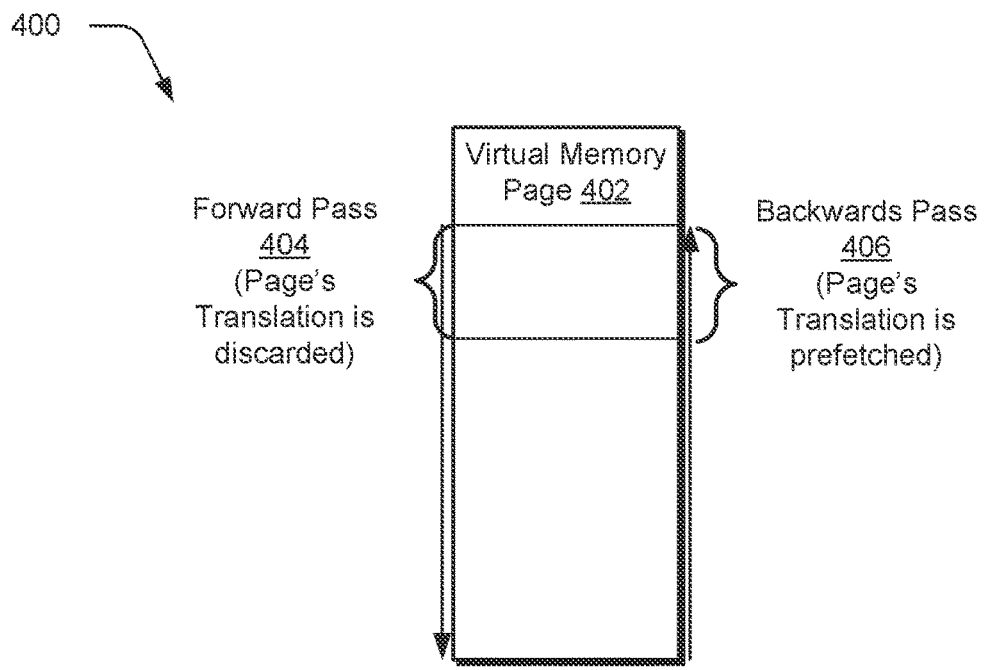
FIG. 4 is a block diagram of a non-limiting example system showing use of reuse distance information for translation prefetching techniques by an address translation agent.

FIG. 4 is a block diagram of a non-limiting example system 400 showing use of reuse distance information for translation prefetching techniques by an address translation agent 302. In deep neural network (DNN) training, memory access involves different patterns based or whether a forward or backwards pass is encountered.

In a virtual memory page 402, for instance, pages in initial layers of a forward pass 404 have a higher reuse distance than pages in the later layers. Accordingly, indication of this pattern and scenario in the metadata 124 is usable by the address translation agent 302 to discard entries 116 for the pages in the initial layers. Entries 116 for pages in the later layers are maintained by the address translation agent 302 in the address translation queue 118. For a backwards pass 406, entries 116 for those pages are perfected by the address translation agent 302, thereby optimizing address translation and device operation.

Figure 5:
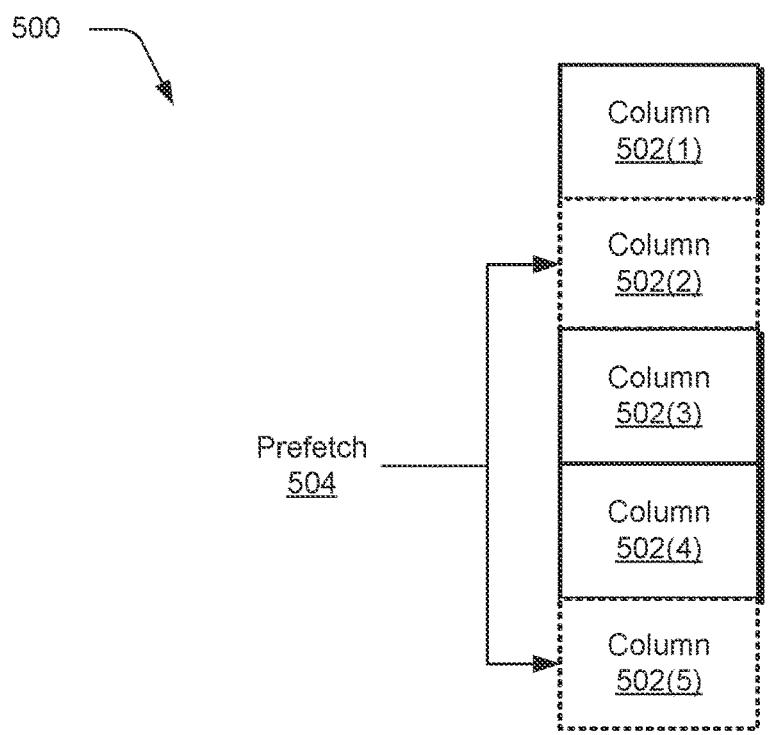
FIG. 5 is a block diagram of a non-limiting example system showing irregular prefetching enabled through data structure analysis.

FIG. 5 is a block diagram of a non-limiting example system 500 showing irregular prefetching enabled through data structure analysis. The address translation agent 302 is also configurable to make intelligent translation prefetch requests. Following the above example, a dense linear algebra kernel typically employs regular memory accesses and is viewable as streaming contiguous memory pages as access is performed to contiguous row and column data for corresponding matrixes. The dispatch packet, therefore, is configurable to include metadata 124 that informs the address translation agent 302 that the kernel behaves as a streaming kernel. In response, the address translation agent 302 initiates prefetching of contiguous pages as memory access from a compute accelerator near a page boundary.

Alternatively, SpLA the memory accesses are typically irregular due to sparsity thus making these accesses harder to predict. For example, operating on matrixes stored in compressed sparse row (CSR) format are highly irregular due to the seemingly random-access pattern into the column vectors. However, the CSR data structure is typically static and a known prior. Thus, in this example the address translation agent 302 interprets the CSR column indices array directly to prefetch translations ahead of time.

In the illustrated example, first, second, third, fourth, and fifth columns 502(1), 502(2), 502(3), 502(4), 502(5) of data are illustrated. Entries are maintained in the TLB 118 for the first, third, and fourth columns 502(1), 502(3), 502(4). The address translation agent 302 then determines that the second and fifth columns 502(2), 505(5) lie at page boundaries, and based on this, initiates a prefetch 504 of those columns.

Similarly, for the DNN training example above, entries describing translations of pages used in later layers are kept in the TLB 118 and entries having translations corresponding to the earlier layers are discarded. Additionally, entries corresponding to the early layers' pages translations are prefetched in a timely fashion on the backwards pass 406.

In virtualized accelerator environments, several process/kernels are typically executed simultaneously on the accelerator simultaneously. Thus, managing TLB 118 requests for fairness and priority are usable to achieve benefits in performance and throughput when quality-of-service is a concern. As an example, priority information or deadlines for tasks to meet a respective service level agreement (SLA) are provided to the address translation agent 302 via the metadata 124. The QoS management module 126 of the address translation agent 302 then uses this information from the metadata 124 to schedule and batch entries 116 corresponding to translation requests.

For tasks that have high priority or short SLA deadlines, for instance, these requests are eagerly scheduled. Additionally, priority along with other information as previously described above is usable by the memory management agent 114 to manage the TLB 118. Entries 116 corresponding to higher priority requests, for instance, are given priority by the address translation agent 302 for caching in the TLB 118. In instances in which a task has lower priority or has a longer SLA deadline, the address translation agent 302 batches entries 116 corresponding to these translation requests. For example, the address translation agent 302 opens a window for translation requests and as the SLA deadline nears (e.g., based on a threshold) the memory management agent 114 closes the window and sends entries corresponding each of translation requests in a single request.

Functionality of the memory management agent 114 is configurable using fixed-function hardware. As previously described in relation to FIG. 3, functionality of the memory management agent 114 is also configurable in part through inclusion of a programmable command processor 304, e.g., using a RISC-V CPU executing domain-specific firmware. The command processor 304, for instance, is configurable as a heterogeneous system architecture agent, where a primary heterogeneous system architecture agent sends service requests to the command processor 304 using architected queuing language (AQL) agent dispatch packets.

While general and programmable accelerators (e.g., GPUs) are configurable to support a wide variety of use cases, domain-specific accelerators are configured for targeted functionality, thus supporting intelligent address translation queue 118 management. However, slight variations in virtual memory usage are encountered in real-world scenarios based on input data or individual kernel characteristics. Thus, programmability of the command processor 304 in conjunction for operation with the memory management agent 114 of the address translation agent 302 supports use domain-specific firmware on the command processor 304 to tailor the TLB 118 functionality to specific use cases. Additionally, as applications evolve the programmability of the command processor 304 evolves with them.

Accordingly, the TLB management techniques based on the metadata support improved management of address translation queue 118 entries 116 and reduced translation latency. These techniques also support increased precision and timeliness through use of prefetching of entries and corresponding translations, which reduces translation overhead. Further, the ability to program policies 312 of the command processor 304 for operation in conjunction with the memory management agent 114 supports domain-specific optimizations and accelerator reuse across applications.

FIG. 6 depicts a procedure 600 in an example implementation of command packet generation by a host to include metadata. A command packet is generated by a host. The command packet includes a virtual address, and metadata describing a memory access characteristic (block 602). The command packet is also configurable to include an instruction, series of instructions, commands, and so forth. By way of example, the command packet 108 is received by the memory management unit 104 from the host 102. The command packet 108 includes metadata 124.

The command packet is transmitted by the host for receipt by a memory management agent. The metadata is configured to control management of entries in a TLB by the memory management agent. The entries support translation of virtual and physical addresses (block 604). By way of example, the command packet 108 is transmitted by the host 102 to the memory management unit 104. The command packet 108 includes the metadata 124 as described above. The metadata 124 is usable by a memory management agent 114 of the memory management unit 104 to control which entries 116 are maintained in the TLB 118. An example of which is further described below.

FIG. 7 depicts a procedure 700 in an example implementation of receipt of command packet including metadata and use of the metadata to control inclusion of entries in a TLB. A command packet is received by a memory management agent. The command packet includes a virtual address, and metadata describing a memory access characteristic (block 702) and may also include a instruction, command, sequence of instructions, and so forth. By way of example, the command packet 108 having the metadata 124 is received by a memory management agent 114 of the memory management unit 104, e.g., from the host 102.

The memory management agent controls which entries are maintained in a translation lookaside buffer (TLB) based on the metadata. The entries support translation between a virtual address and a physical address of physical memory (block 704). By way of example, the memory management agent 114 controls which entries 116 are maintained in the TLB 118 based on the metadata 124. Examples of functionality to do so are illustrated as a QoS management module 126, a prefetch management module 128, and a pattern management module 130. By way of another example, page migrations are triggered based on the metadata. Page migrations, page placement, and page pre-fetching are utilized to move actual memory pages that correspond to the translations to the device's memory (e.g., physical memory) in anticipation of future usage. Similarly, the pages are removable from the device memory to make space for pages that have increased usefulness, e.g., if the pages being removed have a high reuse distance.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host 102 and device 202) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
   receiving, by a processor, a command packet including a virtual address of data to be accessed by a workload executed by the processor and metadata indicating a memory access pattern of the workload that indicates a likelihood that the data will be reused by the workload, the memory access pattern indicating a reuse distance of the data; and
   in response to the reuse distance being above a threshold, preventing, by the processor, caching of an entry in a translation lookaside buffer, the entry supporting translation between the virtual address and a physical address of the data in physical memory.

2. The method of claim 1, wherein the entry is stored in the physical memory.

3. The method of claim 1, further comprising:
   in response to the reuse distance being below or equal to the threshold, caching, by the processor, the entry in the translation lookaside buffer.

4. The method of claim 1, wherein the memory access pattern is a dense memory access pattern and the processor is configured to dynamically maintain storage of or store entries associated with the dense memory access pattern in the translation lookaside buffer.

5. The method of claim 1, wherein the metadata also indicates a domain type and the caching is also based on the domain type.

6. The method of claim 3, wherein the caching further includes invalidating at least one entry in the translation lookaside buffer or replacing at least one entry in the translation lookaside buffer.

7. The method of claim 3, wherein the caching ncludes prefetching at least one entry to the translation lookaside buffer based on the metadata.

8. The method of claim 1, further comprising:
   controlling caching of the entry in the translation lookaside buffer based on quality-of-service.

9. The method of claim 8, wherein the controlling includes controlling page migrations, page placement, page pre-fetching, or page removal.

10. The method of claim 1, wherein the virtual address is part of a unified virtual memory space in which a central processing unit and a parallel compute unit share the physical memory as part of a heterogeneous system architecture.

11. A device comprising:
    a translation lookaside buffer configured to store entries for translation between virtual addresses and physical addresses; and
    a processor configured to manage which of the entries are stored in the translation lookaside buffer based on metadata received via a command packet, the command packet including a virtual address of data to be accessed by a workload and the metadata including a memory access pattern of the workload that indicates a likelihood that the data will be reused by the workload, the memory access pattern indicating a reuse distance of the data, the entries associated with the reuse distance above a threshold being prevented from caching in the translation lookaside buffer.

12. The device of claim 11, further comprising physical memory accessible via the physical addresses, and wherein the virtual addresses implement a unified virtual memory space in which a central processing unit and a parallel compute unit share the physical memory as part of a heterogeneous system architecture.

13. The device of claim 11, further comprising a command processor that is configured to receive the command packet having the metadata, an instruction, and the virtual address and transmits the metadata to the processor.

14. The device of claim 13, wherein the command processor is configured as a programmable microcontroller to implement at least one policy controlling transmission of the metadata to the processor.

15. The device of claim 11, wherein the processor is configured to manage address translation requests.

16. The device of claim 15, wherein the processor is configured to manage at least one said address translation request by deferring transmission of the at least one said address translation request.

17. The device of claim 15, wherein the processor is configured to batch a plurality of address translation requests as a single request.

18. The device of claim 17, wherein the plurality of address translation requests correspond, respectively, to a plurality of commands.

19. A method comprising:
    generating, by a first processor, a command packet including a virtual address of data to be accessed by a workload executed by the first processor and metadata indicating a memory access pattern of the workload that indicates a likelihood that the data will be reused by the workload, the memory access pattern indicating a reuse distance of the data; and
    transmitting, by the first processor, the command packet for receipt by a second processor, the metadata configured to control caching of entries in a translation lookaside buffer by the second processor, the entries supporting translation of virtual and physical addresses, the entries associated with the reuse distance above a threshold being prevented from storage in the translation lookaside buffer.

20. The method of claim 19, wherein the command packet includes an instruction configured to load the data from physical memory.

* * * * *